United States Patent [19]

Unde

[11] 4,386,727
[45] Jun. 7, 1983

[54] PREVENTION OF BUILD UP OF RESIDUAL STRESSES IN WELDS DURING WELDING AND SUBSEQUENT REHEAT CYCLES

[76] Inventor: Madhav A. Unde, 3606 Lake Forest Dr., #7, Omaha, Nebr. 68164

[21] Appl. No.: 152,625

[22] Filed: May 23, 1980

[51] Int. Cl.³ .............................................. B23K 28/00
[52] U.S. Cl. .................................... 228/102; 228/103; 228/104; 228/110
[58] Field of Search ............... 228/102, 103, 104, 105, 228/110

[56] References Cited

FOREIGN PATENT DOCUMENTS 47-32900 8/1972 Japan .................................... 228/102
539713 2/1977 U.S.S.R. .............................. 228/103

Primary Examiner—Gus T. Hampilos

[57] ABSTRACT

A process is described in which a weld is produced without residual stresses; or with residual stresses reduced to a low value. Stress cycles of low value at low frequency are applied in the longitudinal direction of the weld by means of an air operated vibrator during welding. Application of stress cycles may be continued after welding, during or after reheating which may be applied to the solidified weld. Stress cycles are applied at high temperature when the weld metal is in a molten state, semi-solid state and solidified state, and thus brings about reduction in dislocation density in solidified crystals. Stress exists at each dislocation and since the dislocation density is reduced, reduction in residual stress takes place thereby eliminating the need for additional stress relieving operations. Since stress cycles are applied during welding, gases in molten metal are driven out and porosity in the solidified weld is reduced.

9 Claims, 7 Drawing Figures

PREVENTION OF BUILD UP OF RESIDUAL STRESSES IN WELDS DURING WELDING AND SUBSEQUENT REHEAT CYCLES

BACKGROUND OF THE INVENTION

My invention relates to welding processes and particularly for production of welds without residual stresses or with residual stresses of low value and reduced porosity. The process described, however, can be applied to any operation such as casting and brazing. The process is also useful for reducing the residual stresses when molten metal is solidified or when the product which can be a casting, forging or a weldment is heated to temperatures at which dislocation movements can be achieved with the application of low stress cycles.

It is known that stresses come into existance around each dislocation. Dislocation, a known natural metallurgical defect, exists in every metal crystal and it is not possible to eliminate dislocations entirely from any metal. If the density of dislocations can be reduced however, the gross stress which remains in the metal as residual stress can be reduced. It is advantageous to produce an end product without harmful levels of residual stresses. At higher temperatures, such as those near the solidification temperature of a metal, lower external stresses can cause greater movements of dislocations. Mechanisms such as cross-slip and annihilation are known to come into effect in crystals, reducing the density of dislocations. Reduction in their density can thus be brought about. At any other lower temperatures higher external stresses may be required for the movements of dislocations.

Thus a dislocation movements at lower temperature, i.e. room temperature at 20° Centigrade, are known to require external stresses of higher value for their movements in comparison to stresses close to solidification temperature for, e.g., aluminum alloys. Dislocation density in various metals is known to be based on variables, some of which are temperature dependent. In some metals, such as pure aluminum, non-temperature dependent factors do not exist. Accordingly, the application of vibratory stress at room temperature after the weld is made has resulted in little success.

Another method used in industry for reduction of residual stresses involves the process of annealing. Annealing depends upon the movement of dislocations at annealing temperatures. This process is based on the thermal property of the metal at its annealing temperature. No precise time of holding at annealing temperature can be calculated, since data regarding the residual stresses of a metal product is generally unknown due to its complex, inter-crystalline nature. Thus, the time of holding a metal part at the annealing temperature usually depends on the thickness of the metal involved. Dislocation reducing mechanisms come into effect during the annealing process, and a new balance of residual stresses at low values comes into existance. In contrast, at absolute zero temperature movement of dislocations must occur by athermal means.

Porosity is another defect in welds. And only by use of inert atmosphere, fluxes, and materials which are known to give least gaseous by-products; can some control be exerted on formation of this defect. Once a weld solidifies, its porosity cannot be reduced. It is, however, possible to reduce the porosity in welds, if stress cycles are applied throughout the welding operation so that during solidification, semi-solid and liquid stages, entrapped gases are driven out.

During semi-solid stage of the weld metal, it is known that metal atoms deposit on solidified atomic planes which are available, thereby facilitating the growth of crystals. There are numerous orientations in which further growth due the deposit of atoms can take place; an advancing solidification wavefront generates numerous dislocations. A small force applied at this instant can reduce the density of dislocations.

It is known that residual stresses in welded materials can bring about distortion, and may become detrimental to the structure under certain conditions.

Since additional outlay is needed for annealing industrial furnaces, handling and fuel costs, there is a need for a process which will eliminate such costs and time delays in stress relieving operations of weldments. There is also a need for a controllable process which will reduce the entrapment of gases in welds during welding, since welds without porosity are desirable. The instant invention is directed toward those needs.

SUMMARY OF THE INVENTION

It is therefore a principal object of my invention to develop a process which can be used with a welding process like Gas Metal Arc Welding (GMAW), Submerged Arc Welding (SAW) to reduce the level of residual stresses in welds.

Another object of my invention is to develop a process by which welds are produced with reduced porosity.

Another object of my invention is to provide a process which will eliminate the need for annealing furnaces and space required for the furnaces.

Another object of my invention is to provide a process which will reduce the industrial handling and time delays due to additional stress relieving operations.

A still further object of my invention is to provide a process which will produce sound welds without harmful levels of residual stresses, thereby avoiding distortion weld failures in complex welded structures.

I have found that these and other objects may be attained by a process in which stress cycles of low value and low frequency are applied during welding operations.

More particularly, these objects may be attained when stresses are applied to weld metal in semi-solid and in solid state near the solidification temperature of the materials involved in welding.

More particularly, these objects may be attained by applying reheat cycle or cycles to the solidified weld metal and application of stress cycles.

More particularly, these objects may be obtained when stress cycles are applied to weld in the longitudinal direction of the weld, in which residual tensile stress is known to be maximum in cold weld.

Further objects and features of the invention will be apparent from the following specifications and claims when considered in connection with drawings illustrating several embodiments of my invention.

BRIEF DESCRIPTION OF THE DRAWINGS

FIGS. 3 and 4 show the dislocation density in specimens prepared from similar locations in both welds samples.

FIGS. 5 and 6 show density of pores in specimen prepared from similar locations in both weld samples.

Figure 1:
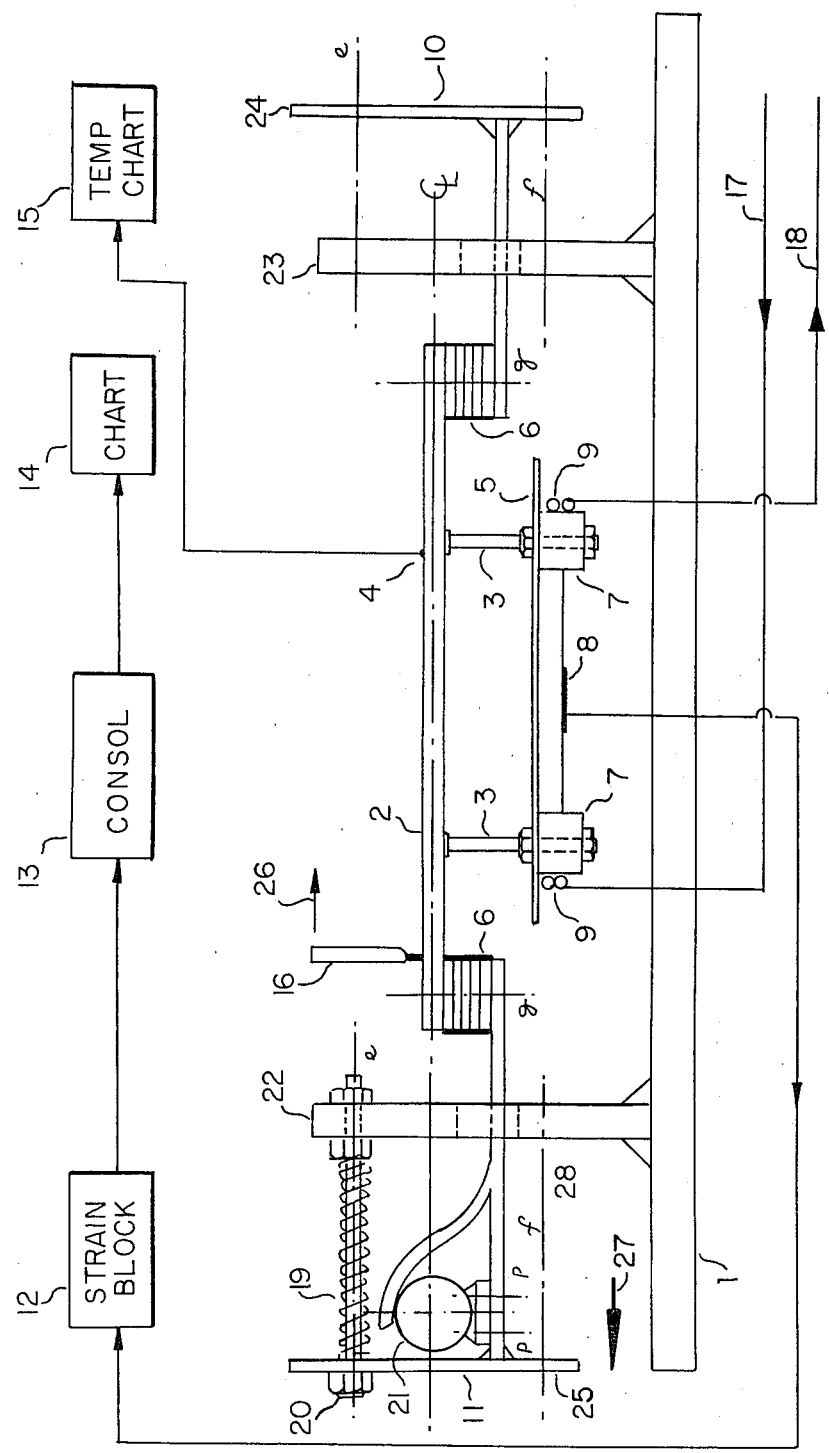
FIG. 1 is a schematic layout of the experiment devised for obtaining the results shown in FIGS. 2,3,4,5 and 6, to illustrate my invention.

In describing the preferred embodiment of the invention illustrated in the drawings, specific terminology will be used for the sake of clarity. However, it is not intended to be limited to the specific terms so selected, and it is to be understood that each specific term includes all technical equivalents which operate in a similar manner to accomplish a similar purpose.

DESCRIPTION OF THE PREFERRED EMBODIMENTS

The experimental layout as shown in FIG. 1 comprises a specially designed and annealed aluminum alloy 5083 plate 2. This alloy is preferred for experimentation since non-temperature dependant factors which affect dislocation are not prominent in the alloy. Other metal alloys such as steel or cast iron can be used for experimentation in a similar manner.

Aluminum studs 3 are welded to the plate 2 on the longitudinal center line of the weld for mounting a steel strip 8 on which a strain gauge is cemented. In order that the strain gauge should not be affected from the heat of welding to ensure reliable repeatability, the devise substantially comprises a screening asbestos board 5, two heat insulation cells 7 and copper pipes 9 brazed around insulation cells 7 for circulating water from inlet pipe 17 and outlet pipe 18. The strain gauge carrying steel strip is held between cells 7 secured to each of the cells at each end by screws.

Fixture 1 provides two vertical plates 22 and 23 welded to base plate 1 and suspends the specimen plate 2. Bracket 11 provides horizontal plate 28 welded to vertical plate 15 and carries an air operated vibrator 21 bolted to horizontal plate 28, both centerlines being shown by letter "P". Similarly, bracket 10 provides vertical plate 24. Plates 23 and 24 and plates 22 and 25 on each side of the specimen plate 2 provide center lines "e" and "f".

The suspension of the specimen aluminum alloy plate 2 is achieved by bolts 20, center lines of which are shown by letters 'e' and 'f' in FIG. 1; Each of these bolts 20 is fastened on the right vertical plate 22 and plate 24 at both ends of the specimen plate 2. Bolts 20 carry springs 19 and are free to move through each of two left vertical plates 25 and 23 at both ends of the plate 2. Bolt heads limit the outward motion of the brackets 10 and 11, the springs 19 on bolts 20 serve to damp vibration on the return stroke.

The asbestos insulation strips 6 thru which bolts (not shown) pass to hold the specimen plate 2, are intended to restrict the flow of heat to the strain gauge mounted on steel strip 8. This precaution is necessary in order to protect the reliability of operation of the strain gauge. Center lines of bolts holding the specimen plate 2 to the brackets 10 and 11 are shown by letter 'g'.

Welding gun nozzle 16 of the GMAW unit is shown in FIG. 1 in which the direction of welding is shown by arrow 26. The arrow 27 near bracket 11, indicates the direction in which the vibrator applies the tensile stress cycles to the weld. The center line of the vibrator 21 in which the stress cycles are applied should be in the neutral plane of the plate 2.

A calibrated strain gauge block 12 maintains one arm of a wheatstone bridge. Console 13 is calibrated for null balance; and as the resistance of the strain gauge 8 alters (because of strains induced in it due to stress in weld on specimen plate 2), the out of balance voltage is recorded on chart 14.

Thermocouple 4 is secured to the specimen plate 2 and recorder 15 records the temperature of specimen plate 2 during welding.

A heating Oxyacetylene torch (not shown) is manually used to reheat the weld specimen. It is possible to use a graduated heating device such as electrical heating system and it is obvious that such a device can be integrated with the welding circuit so that desired temperatures are automatically maintained after the welding is completed.

Application of stress cycles commencing simultaneously with welding can be integrated with the welding circuit and can also be made automatic in operation I have performed experiments in which welds have been laid on plates with V-grooves machined on them and the plates were annealed. In practice, however, it is only necessary to lay welds along the groove or butt formed by abutting two plates without any adjuncts used, as explained above. Similarly, for applying stress cycles, an air operated vibrator has been used in the preferred embodiment; but, obviously, any other device which can apply stress cycles commencing with welding simultaneously, can also be integrated with the welding circuit and can be made automatic.

As shown in FIG. 1, the longitudinal direction of the weld is selected for application of stress cycles, since in cold untreated welds maximum tensile residual stresses are known to exist in this direction due to welding.

OPERATION

Stresses developed in a weld cause proportional strains in the strain gauge within the temperature range specified by the strain gauge manufacturer. Strains develop resistance changes in the strain gauge which impart a proportional voltage imbalance in the wheatstone network; this imbalance is indicated on recorder 14.

Figure 2A:
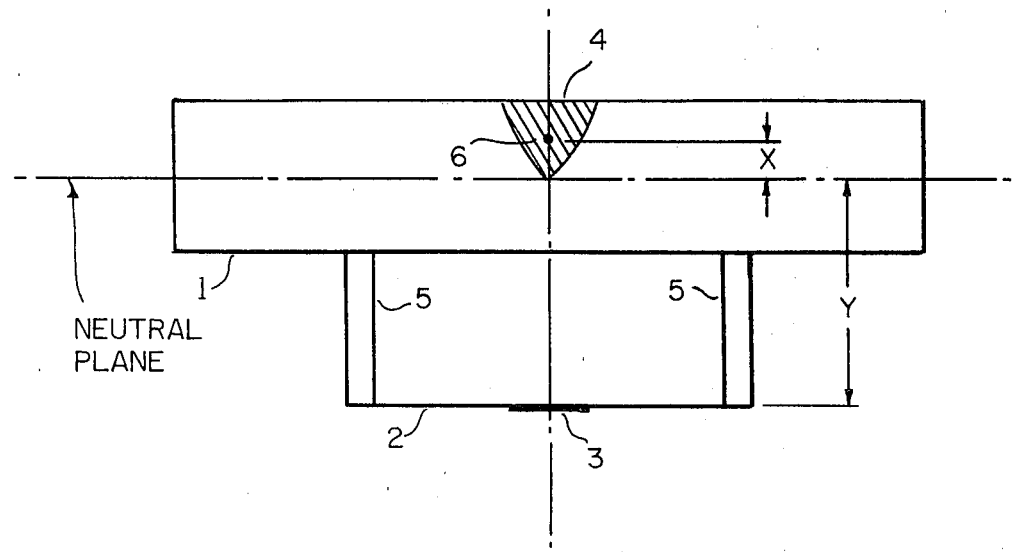
FIG. 2A is a schematic layout for deriving equations.

In FIG. 2A, which is schematic diagram, cross-section 4 of the weld is revolved 90° to show the center 6 of the nugget of the weld represented by cross section 4. The center 6 is 'x' inches away from the neutral plane. The strain gage cemented on steel strip 2 which itself is suspended as bridge between two studs 5 is away from the neutral plane by 'y' inches. The studs 5 are welded to specimen plate 1. Therefore, Stress in strain gage multiplied by y=stress in weld nugget multiplied by x Therefore, Stress in weld nugget=y divided by x and multiplied by the Stress in strain gage; But, Since strains in strain gage are proportional to stress in it, and since, Strains in strain gage = a constant $k_1$ multiplied by the change in electrical resistance in the strain gage, Therefore, the stress in weld nugget = a constant $k_2$ multiplied by the resistance of the strain gauge.

Since the wheatstone bridge in which the strain gauge forms one arm is calibrated, for null balance before the start of the experiment, the change in resistance of thestrain gauge is recorded as unbalanced millivolts. Therefore, Stress in weld nugget = a constant $k_3$ multiplied by the millivolts recorded.

Figure 2B:
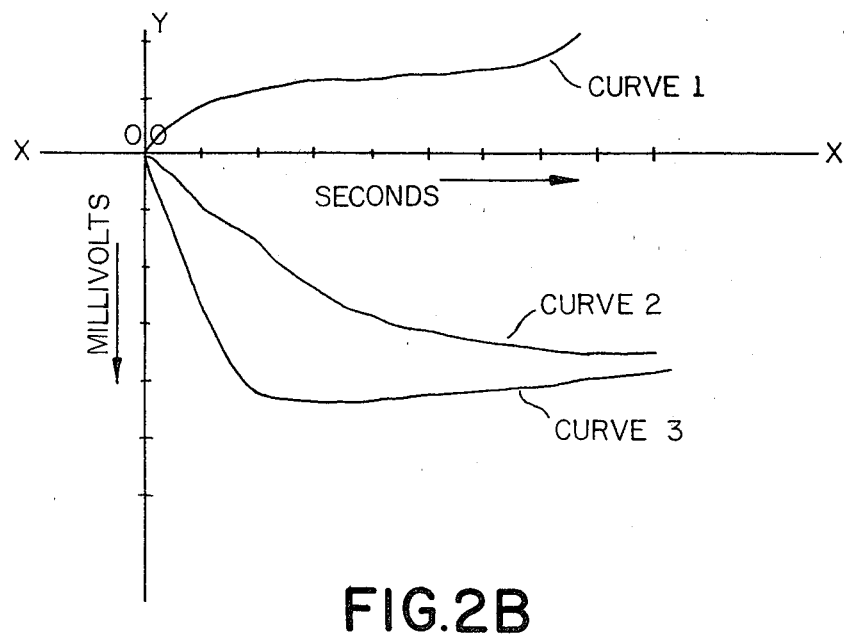
FIG. 2B is the graph in which various curves obtained are plotted.

In FIG. 2B, curve 1 shows the increase in residual stress in the control sample. The control sample was never subjected to any stress cycling; and curve 1 was plotted according to the formula derived after determining the constant of proportionality, $k_3$. Curve 2 in FIG. 2B was obtained in similar manner, and shows a weld which was subjected to stress cycling during welding operation only. This curve shows reduction in residual stress. Curve 3 in FIG. 2B shows reduction in residual stresses in the weld sample in which stress cycling was applied during welding and subsequently after reheating the weld manually with oxyacytelyne torch. In the experiments conducted on alloy 5083 with filler wire alloy 5154, argon shielding, the maximum reduction in residual stress calculated was 12,629.2 PSI (pounds per square inch).

Figure 3:
FIG. 3 illustrates a micrograph obtained at ×2000 magnification on Scanning Electron Microscope of the weld specimen from the control sample weld which was not subjected to stress cycles.
Figure 4:
FIG. 4 illustrates the micrograph obtained at ×2000 magnification on a Scanning Electron Microscope of the weld specimen from sample weld which was subjected to stress cycling during welding and after application of the reheat cycle to the solidified weld.

FIG. 3 shows the micrograph on the scanning electron microscope at ×2000 magnification of the actual size of the control sample weld. The control sample weld was not subjected to any stress cycles during or after welding. This must be compared with micrograph also obtained at ×2000 magnification of the sample weld subjected to stress cycling during welding and after subsequent reheat cycle. The micrograph obtained from the sample described in the preceeding sentence is shown in FIG. 4. FIG. 4 obviously shows reduction in etched dislocation pit density in comparison with the micrograph of FIG. 3.

Figure 5:
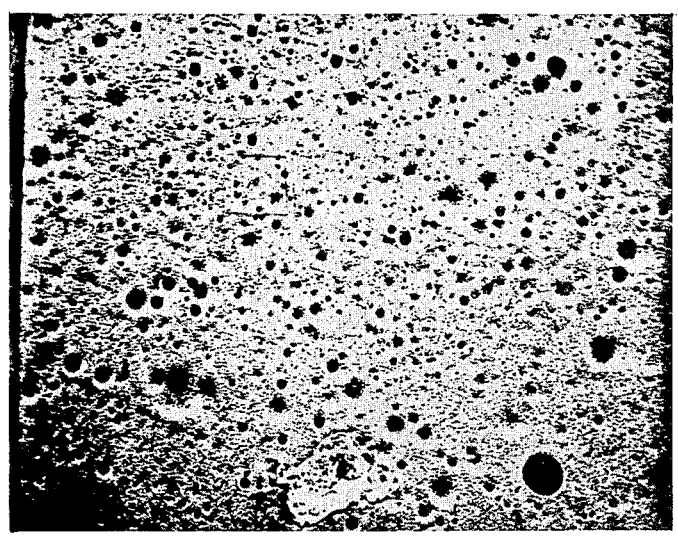
FIG. 5 illustrates the micrograph obtained at ×20 magnification on Scanning Electron Microscope of the weld specimen from control sample weld which was not subjected to any stress cycles.
Figure 6:
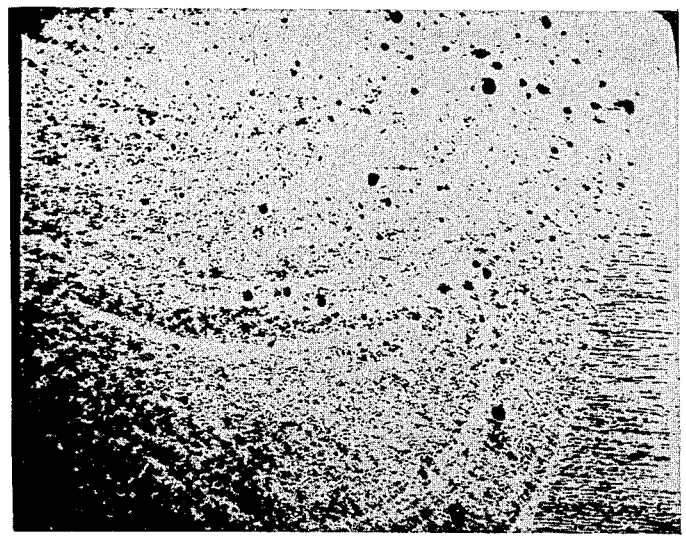
FIG. 6 illustrates the micrograph obtained at ×20 magnification on Scanning Electron Microscope of the weld sample subjected to stress cycling during welding and after application of reheat cycles.

FIG. 5 shows the drawing of the micrograph of control sample weld specimen obtained at ×20 magnification of the actual size. This must be compared with the micrograph of the sample weld specimen of the weld subjected to stress cycling during welding and after subsequent reheating. The micrograph of such a specimen obtained at ×20 magnification of the actual size of the specimen is shown in FIG. 6. FIG. 6 shows the reduction in porosity when compared with porosity of the micrograph of control smaple weld specimen, FIG. 5.

It is be be understood that while detailed drawings and specific experimental examples given describe the preferred embodiments of my invention, they are for illustration only; that the process invented is not limited to precise details and conditions disclosed and various changes can be make within the ambit and scope of my invention. It is also to be understood that the experimental details described hereinbefore are for proving the process invented and in practical application of the invented process a device for applying stress cycles alone is essential and other details such as strain gage, thermocouple etc used during experiment may not be necessary; My invention is defined by following claims:

I claim:

1. A process for applying stress cycles during welding comprising the steps of:
   (a) providing a vibration producing device for applying stress to s specimen plate:
   (b) attaching said device to a specimen plate on which two studs are welded to a surface opposite to a surface on which a weld is made, said studs being adapted to carry a strain gage assembly;
   (c) suspending the specimen plate between two brackets in order to substantially reduce the loss of energy of stress to objects other than the suspended specimen plate;
   (d) mounting a strain gage to said studs for measuring residual stresses generated during a welding operation;
   (e) applying stress cycles to said specimen plate while performing a welding operation thereon and monitoring residual stresses generated therein during the welding operation; and
   (f) cooling said strain gage throughout said welding operation.

2. A process according to claim 1 including graduated reheating of the welded plate, said graduated heating being regulated by automatic controls incorporated into weld equipment performing the welding operation.

3. A process according to any one of claims 1 and 2 wherein the step of applying stress cycles commences manually before the welding operation.

4. A process according to any one claims 1 and 2 wherein the step of applying stress cycles is automatic and substantially simultaneous with starting and stopping of the welding operation.

5. A process according to claim 1 wherein a weld joint is formed in said specimen plate having a transverse axis and a longitudinal axis and wherein the stress cycles are applied along said longitudinal axis so the weld joint.

6. A process according to claim 1 wherein the step of applying stress cycles commences substantially simultaneously with commencement of the welding operation.

7. A process according to claim 1 comprising the additional step of limiting transmission of heat to said strain gage.

8. A process according to claim 7 wherein the step of limiting transmissions of heat to said strain gage is accomplished by adding a screen.

9. A process according to claim 1 further comprising the step of reheating the welded plate while continuing to apply stress cycles.

* * * * *